(12) United States Patent
Bellehumeur et al.

(10) Patent No.: US 11,225,374 B2
(45) Date of Patent: Jan. 18, 2022

(54) COLLAPSIBLE SHIPPING CONTAINER ACTUATOR

(71) Applicant: FEU COLLAPSE, LLC, Tooele, UT (US)

(72) Inventors: Alexander R. Bellehumeur, Long Beach, CA (US); Michael Wells, Long Beach, CA (US)

( * ) Notice: Subject to any disclaimer, the term of this patent is extended or adjusted under 35 U.S.C. 154(b) by 34 days.

(21) Appl. No.: 16/926,494

(22) Filed: Jul. 10, 2020

(65) Prior Publication Data

US 2021/0016960 A1  Jan. 21, 2021

Related U.S. Application Data

(60) Provisional application No. 62/874,403, filed on Jul. 15, 2019.

(51) Int. Cl.
| | | |
|---|---|---|
| *B65D 88/52* | (2006.01) | |
| *F16H 21/46* | (2006.01) | |
| *B66C 1/10* | (2006.01) | |
| *B66C 1/66* | (2006.01) | |
| *F16M 11/22* | (2006.01) | |

(52) U.S. Cl.
CPC .............. *B65D 88/522* (2013.01); *B66C 1/10* (2013.01); *B66C 1/663* (2013.01); *F16H 21/46* (2013.01); *B66C 1/101* (2013.01); *F16M 11/22* (2013.01)

(58) Field of Classification Search
CPC ......... B65D 88/522; B66C 1/101; B66C 1/10; F16H 21/46; F16M 11/22
See application file for complete search history.

(56) References Cited

U.S. PATENT DOCUMENTS

| | | | | |
|---|---|---|---|---|
| 3,892,436 | A * | 7/1975 | Fathauer | B66C 1/663 |
| | | | | 294/81.53 |
| 4,966,085 | A * | 10/1990 | Howe | B65D 88/522 |
| | | | | 108/55.1 |
| 4,986,705 | A * | 1/1991 | Durkin | B60P 3/06 |
| | | | | 410/3 |
| 2008/0011742 | A1 * | 1/2008 | Bellehumeur | B66C 1/663 |
| | | | | 220/1.5 |
| 2008/0290676 | A1 * | 11/2008 | Marcel | B66C 15/00 |
| | | | | 294/81.53 |
| 2010/0135742 | A1 * | 6/2010 | Sain | B65D 90/021 |
| | | | | 410/46 |

* cited by examiner

*Primary Examiner* — Terence Boes
(74) *Attorney, Agent, or Firm* — Fulwider Patton LLP

(57) ABSTRACT

An apparatus and method for lifting and collapsing a collapsible cargo container includes a frame, and vertical guides for aligning the actuator with the cargo container. First and second pusher assemblies engage the end walls of the container to pivot the end walls against the ceiling of the container, where uplocks retain the end walls in a stowed away position. Foldable side walls are then buckled by the weight of the ceiling with assistance from the actuator, until the side walls occupy a predominantly horizontal position between the ceiling/end wall combination and a floor of the cargo container, resulting in a compact configuration. The actuator unfolds the container using steps discussed above in a reverse order.

7 Claims, 5 Drawing Sheets

COLLAPSIBLE SHIPPING CONTAINER ACTUATOR

CROSS-REFERENCES TO RELATED APPLICATIONS

This application claims priority from U.S. Provisional Patent Application No. 62/874,403, filed Jul. 15, 2019, the content of which is incorporated by reference herein in its entirety.

BACKGROUND OF THE INVENTION

The shipping industry employs the use of large cargo containers to transport goods shipped from one location to another. These containers are easily and conveniently loaded and unloaded, and moved using cranes from one form of transport (vehicle or vessel) to another for transport across land and/or sea. Standardizing the size and characteristics of the containers allow their use in every port around the world, and goods traveling to a common destination can be easily moved in large quantities to reduce the amount of time required for loading and unloading the transport vessels.

The cargo containers in use today have largely become standardized in dimension and structural characteristics, and they can easily, conveniently and securely be stacked vertically to maximize the use of hold and deck space on vessels and the like that transport these containers full of goods from various countries.

The principal shortcoming found in the use of cargo containers of the type referred to above resides in the fact that day to day commerce necessitates that these containers once unloaded, on occasion, be transported empty on their return voyage or trip from a station or site of delivery of cargo to a next site or station for loading of cargo. Such transporting of empty containers is a non-profitable use of the vessel's cargo hold since each such container occupies valuable and costly space that could otherwise accommodate a loaded or filled container. Further, the handling and shipping of both loaded and empty containers creates a multitude of other problems. One such problem resides in arranging light, empty containers and heavy, loaded containers aboard ships in such a manner that the ships are properly and safely trimmed.

When transporting a high percentage of empty containers, the voyage of such ships is uneconomical and the inefficiencies must be made up elsewhere with increased costs of goods. In view of the foregoing, large economic savings could be realized if empty containers could be folded or collapsed so that they occupy a fourth or less of the space they occupy in their normal configuration. For example, if four containers, when collapsed, could occupy the space of one container in its normal configuration, the cost of shipping empty collapsed containers would be reduced significantly. There has been significant efforts to design and utilize new collapsible shipping containers to reduce the inefficiencies.

As with conventional cargo containers, collapsible cargo containers require an apparatus called a "spreader" to lift the cargo containers from loading platforms to ships, trains, trucks, and the like, and from ships, trains, trucks, etc. to the loading platforms. These spreaders are large crane structures with interlocking connectors to grip or engage the cargo containers on an upper surface for lifting the containers off a ship onto a truck, off the truck and onto a ship, etc. It is important for the spreader to prevent the containers from tilting or dropping during the transfer operation, so the spreader must remain level and securely attached to the container but allow rapid disconnection to promote efficient loading and unloading. Spreaders are typically utilized at shipping ports, train stations, etc., where large numbers of containers are handled on a daily basis. Some are designed to lift containers of a specific length, while others are adjustable to accommodate various sized containers. Many spreaders are suspended from cranes via a head block or cables, which can be used to lower a claw-like device onto the roof of a container for engagement of the locking mechanisms. Typically, "twist locks" on the spreader engage four upper corner fittings of the shipping container, locking the spreader to the container so that it can be safely lifted. While such spreaders are ubiquitous in the shipping industry, they are predominantly configured for standard cargo containers and therefore cannot be used with the new type of collapsible cargo container developed by the present inventors.

U.S. Pat. No. 7,722,101 is a spreader for a collapsible cargo container, the contents of which are fully incorporated herein by reference. The '101 Patent discloses an actuating mechanism that pushes in the doors of the collapsible container and then buckles the walls to fold the container into a compact arrangement. The actuating mechanism operates in reverse to open or unfold the container from its collapsed configuration, so that the containers may be readily folded for transport and unfolded for use when needed. However, new collapsible containers require modifications to the original actuator, and the present invention improves and modifies the actuator in a reliable and convenient manner.

SUMMARY OF THE INVENTION

The present invention is a collapsible container actuator that is used to fold and unfold shipping containers into their collapsed and open configurations, respectively. The actuator of the present invention has a minimum of six contact points that engage the container and apply the forces and moments necessary to retract the container walls and fold the containers into a compact state. The use of six contact points prevents sagging and provides a more sturdy and reliable operation over the prior actuators, and helps to ensure a level container during the loading and unloading operation when compared with previous spreaders while avoiding racking. The new actuator is far lighter than prior actuators and can be easily moved and transferred from various equipment, and then used on a variety of collapsible shipping containers.

A feature of the actuator is opposed, dual arm linkages that, when combined with corresponding pistons, apply one hundred eighty degree range of motion that are used to rotate the end walls of the collapsible container against the ceiling of the container in a reliable manner. The dual arm linkage significantly improves the leverage applied by the actuator by lowering the point of force, and thereby lessens the magnitude of the force needed to raise and lower the end walls. In a preferred embodiment, this point of force is at the very bottom of the end wall, maximizing the leverage of the actuator. Moreover, the linkages can be moved with simple linear pistons to reduce costs and facilitate replacement parts. Another feature of the actuator is the use of rotatable wheels at the point of contact to reduce friction and avoid damage to the end walls. Instead of bars or pads, the wheels allow some relative motion between the actuator and the end wall without marring or scraping the end walls. Additionally, the actuator is constructed so as to also serve as a stand when not in use.

Other features and advantages of the invention will become apparent from the following detailed description, taken in conjunction with the accompanying drawings which illustrate, by way of example, a new actuator for collapsible cargo containers and method for using same.

DETAILED DESCRIPTION OF THE PREFERRED EMBODIMENTS

Figure 1:
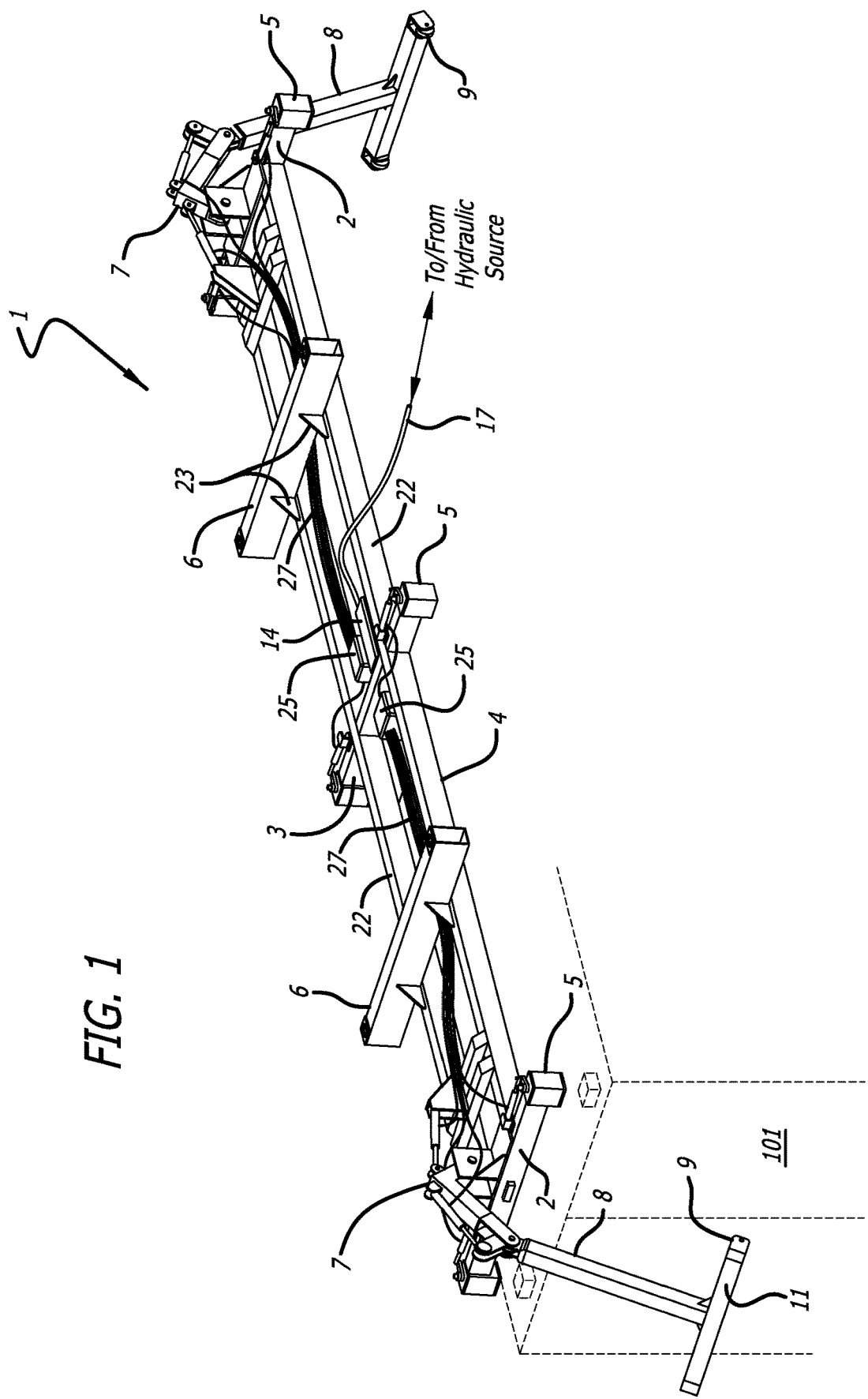
FIG. 1 illustrates an elevated, perspective view of a first preferred embodiment of an actuator of the present invention.

FIG. 1 illustrates a first preferred embodiment of an actuator for a collapsible container such as, for example, the container disclosed in U.S. Pat. No. 9,045,280, the content of which is fully incorporated herein by reference. Actuator 1 can preferably be maneuvered by a modified fork lift truck using a head block or a plurality of lifting cables (not shown), although cranes and other lifting devices are also compatible with the actuator 1. The actuator may receive hydraulic energy from the forklift's onboard hydraulic system and utilize the hydraulic energy to manipulate the various pistons and mechanisms managed by the actuator 1. A main fluid line 17 conveys hydraulic fluid to a hydraulic fluid manifold engine 14, which in turn can utilize the hydraulic fluid via manifolds 25 lines 27 to operate the various mechanisms and pistons on the actuator.

The backbone of the actuator is a frame 4 comprising a pair of full length tubular beams 22 supporting thereon a pair of transverse brace members 6 at first and second intermediate positions along the frame 4. The frame 4 and the transverse brace members 6 may be formed from square steel tube and are welded or bolted together to form a rigid support buttressed by wedge-shaped brackets 23. At each end of the frame 4 are transverse end beams 2 that are each equipped with a pair of downward facing twist-lock assemblies 5 to engage openings in the roof of the container (not shown) and lock onto the container for capture and transport. A central cross beam 3 is disposed at the midpoint of the frame 4 and connects the tubular beams, the cross beam 3 also equipped with downwardly facing twist-locks 5 that engage openings at the upper center of the container.

Figure 2:
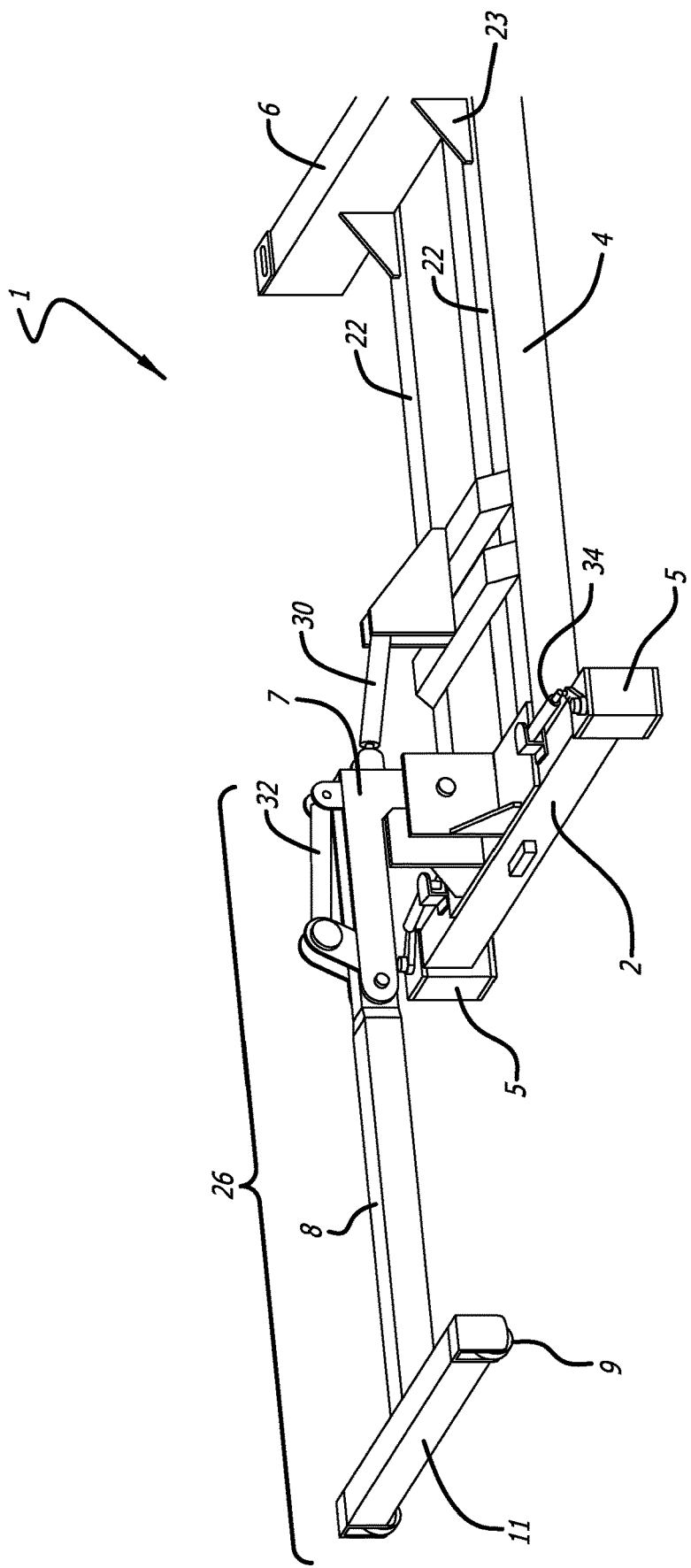
FIG. 2 illustrates a perspective view of a left half of the actuator of FIG. 1 with the arms positioned horizontal to facilitate mounting with the top of a cargo container.

Turning to FIG. 2, the ends of the frame 4 each mount a pivoting pusher mechanism 26 comprised of an upper arm 7 and lower arm 8. The pusher mechanisms 26 are preferably driven by the hydraulic engine 14 mounted at the cross beam 3, although other forms of motors or power systems and their relative positions on the actuator 1 are considered within the skill of the art. Wheels 9 on the distal extension member 11 at peripheral corners of the lower arm 8 engage the container end wall 101. As explained below, as the hydraulic engine 14 drives the arm assemblies, the extension/rotation of the arms 7, 8 of the pusher mechanism causes the wheels 9 to engage and lift the end walls of the collapsible cargo container. FIG. 2 shows the actuator 1 with the upper arm 7 and lower arm 8 in a fully retracted position with both the upper arm 7 and the lower arm 8 horizontal to the ground. This retracted position is adapted to be out of the way for when the actuator 1 is to be mounted to the top of the collapsible cargo container.

FIG. 2 further illustrates a pair of pistons 30, 32 each journaled on respective lugs and configured to apply the necessary directional forces to rotate the pusher mechanism 26 in the proper arc to collapse the containers. Also, the twist-lock devices 5 are engaged and disengaged using linkages 34 mounted on top of the frame 4, where said linkages are manually or automatically controlled with appropriate mechanisms.

Figure 3:
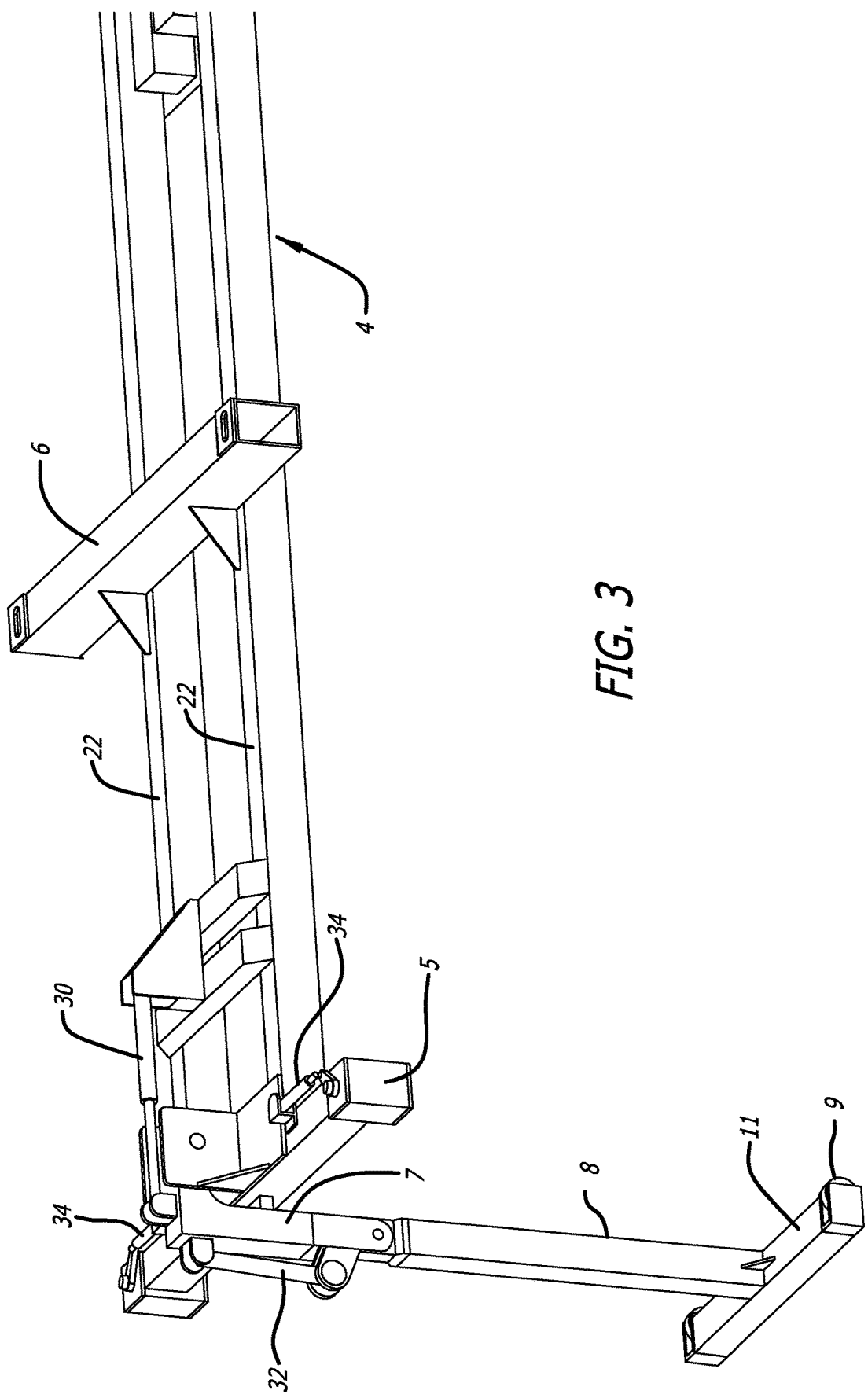
FIG. 3 illustrates a perspective view of the left half of the actuator of FIG. 1 with the pivoting arms positioned vertically to bear against a cargo container door.

FIG. 3 illustrates the pusher mechanism 26 in a vertical orientation due to the force applied on the upper arm 7 by the first piston 30. Lower arm 8 is vertical and the extension member 11 is in a position to bear against the end wall 101 of the collapsible cargo container prior to beginning the collapsing sequence. This position is accomplished by the hydraulic engine 14 causing the piston 30 to extend, rotating upper arm 7 by ninety degrees counterclockwise from the horizontal orientation to the vertical orientation. In this position, the piston 32 has not been activated and lower arm 8 remains linear with upper arm 7.

Figure 4:
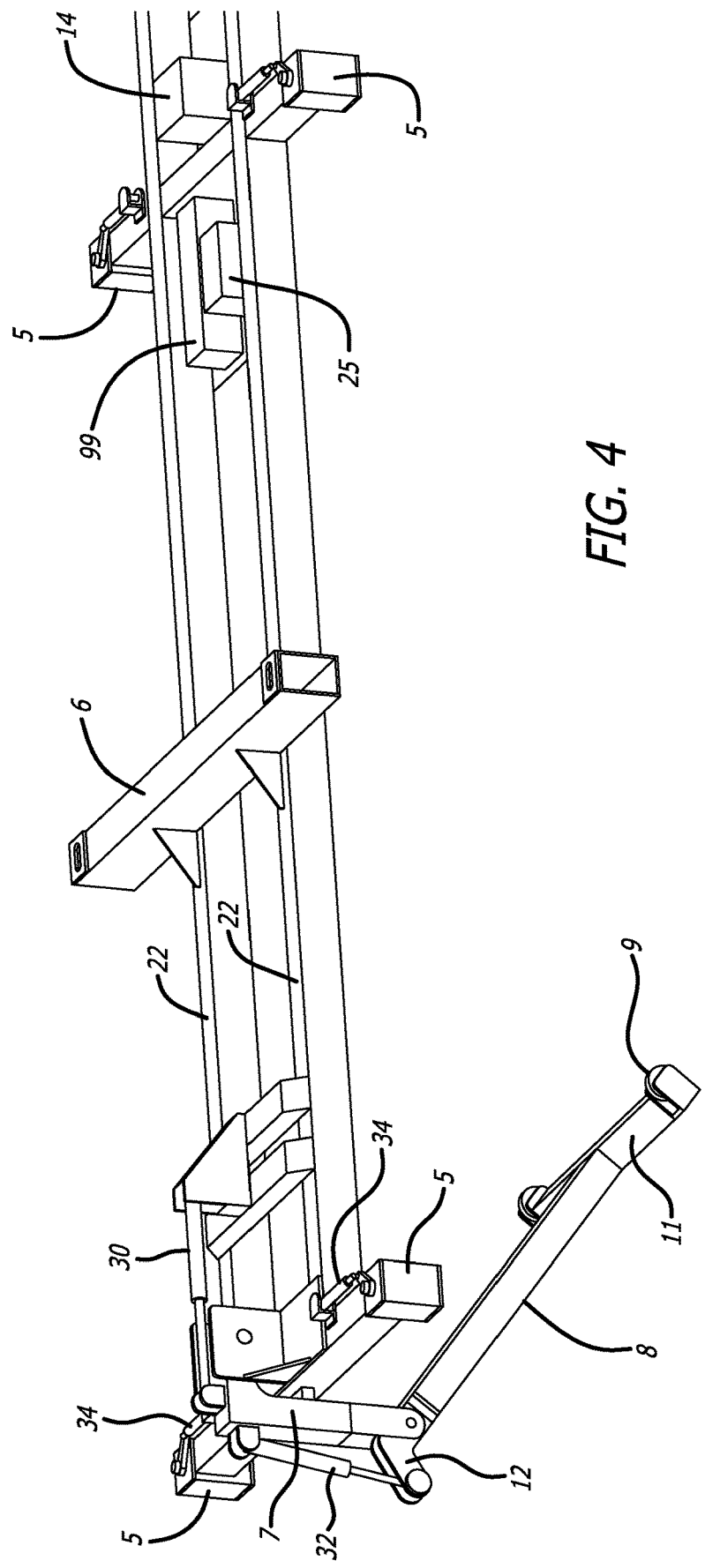
FIG. 4 illustrates a perspective view of the left half of the actuator of FIG. 1 with the pivoting arms halfway thru an upward rotation back to horizontal to push up the cargo doors as part of collapsing sequence.
Figure 5:
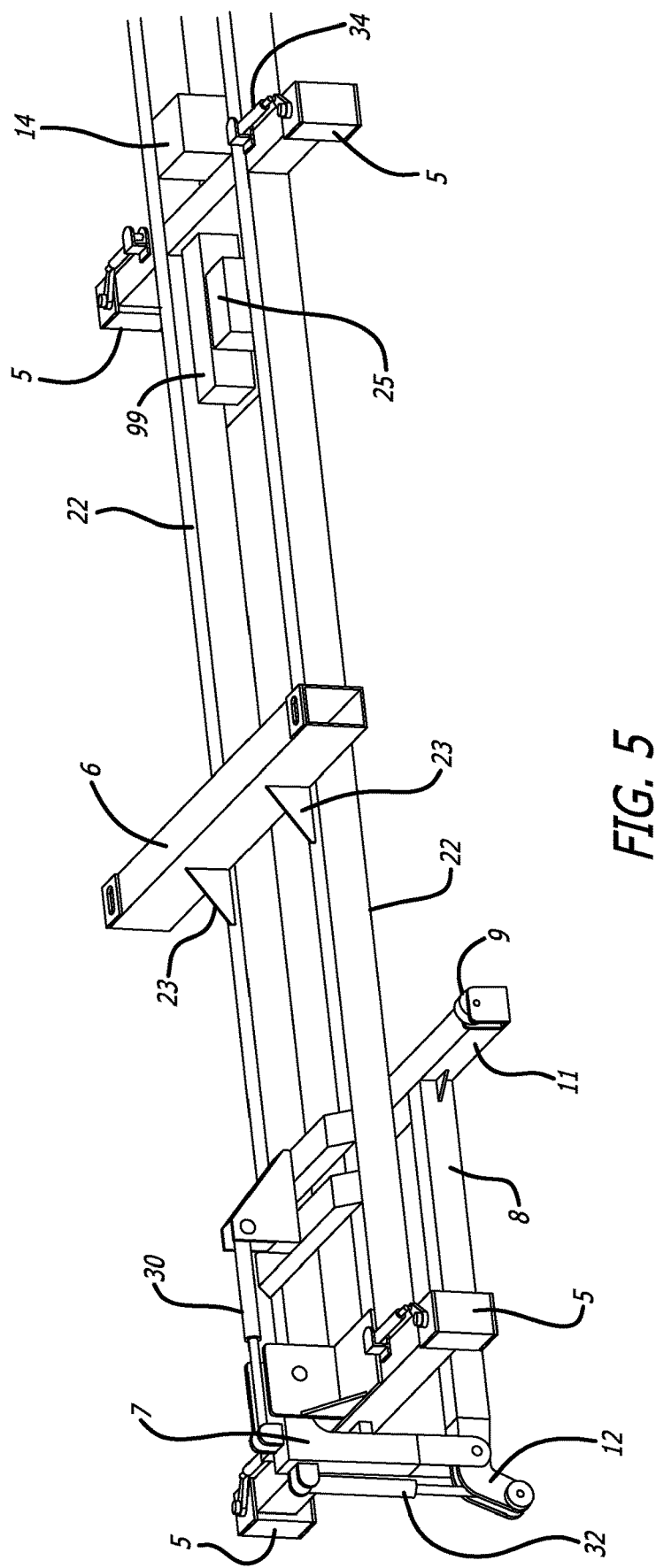
FIG. 5 illustrates a perspective view of the left half of the actuator of FIG. 1 with the pivoting arms at the completion of the upward rotation of the cargo doors rotated against cargo container ceiling as part of collapsing sequence.

In FIG. 4, the pusher mechanism 26 has been rotated further by the second piston's 32 extension at the rocker arm 12 to rotate the lower arm 8 inwardly (counterclockwise) to push the end wall of the container about its upper hinge and rotate the end wall against the ceiling of the container. The fluid lines 27 have been removed for clarity, but connect to the pistons 30, 32 and twist lock mechanisms 34. A power supply 99 may also be incorporated into the structure of the actuator 1 that can power the hydraulic engine 14. In FIG. 5 where the rotation is complete and the lower arm 8 has undergone one hundred and eighty degrees of rotation from its retracted position (FIG. 2) to its fully extended position (FIG. 5). The operation is reversed to unlock the end wall from the container and unfold the container.

The dual arm linkage 26 is capable of rotating through a one hundred eighty degree range of motion that allows for mounting on the cargo container and for moving the end walls of the collapsible container against the ceiling of the container in a most reliable manner. The dual arm linkage also provides the most reliable way to detach the end walls from the cargo container ceiling with the minimal amount of torque on the actuator. It must be kept in mind that the end walls of the containers can be over one thousand pounds, and other linkages are incapable of rotating the end wall through the necessary arc to attach and detach from the cargo container ceiling.

Moreover, the dual arm linkage improves the leverage of the actuator by lowering the point of force and thereby lessening the magnitude of the force needed to raise and lower the end walls. In a preferred embodiment, this point of force (wheels 9) occurs at the very bottom of the end wall, maximizing the leverage of the actuator 1. Another feature of the actuator 1 is the use of rotatable wheels 9 at the point of contact to reduce friction and damage to the end walls. Instead of bars or pads, the wheels allow some relative motion between the actuator 1 and the end wall without marring or scraping the end walls. Another important benefit is that the dual arm system applied at each end of the container simultaneously reduces the opportunity for the doors to twist, as twisting could prevent successful locking of the doors into their mooring on the ceiling. Additionally, the actuator is constructed so as to dual as a stand when not in use.

While various features and aspects of the present invention have been depicted and described, it is to be understood that the invention is not properly limited to the drawings and the descriptions herein. A person of ordinary skill in the art would readily recognize that certain substitutions, modifications, and alterations are available (e.g., making the actuators for specific sized containers) and the scope of the invention is properly intended to include all such substitutions, modifications, and alterations. Accordingly, unless expressly limited herein, the scope of the claims is properly governed by the words of the appended claims using their customary and ordinary meanings, consistent with but not limited by this disclosure and these drawings.

We claim:

1. A collapsible shipping container actuator for collapsing and expanding a container, the actuator comprising:
   a rigid frame comprising first and second longitudinal tubular beams connected by transverse brace members;
   first and second transverse end beams each comprising a pair of downward facing twist-lock assemblies;
   first and second pivoting pusher assemblies mounted respectively to the first and second transverse end beams, each pivoting pusher assembly comprising an upper arm and a lower arm rotational about a connection with the upper arm;
   a hydraulic engine connected to the first and second pusher assemblies for pivoting the pusher assemblies into engagement with respective end walls on the collapsible shipping container; and
   whereby the hydraulic engine drives the upper arms to cause rotation of the pivoting pusher assembly, causing the lower arms to engage and rotate the respective end walls of the collapsible cargo container.

2. The collapsible shipping container actuator of claim 1, further comprising wheels on the lower arms of the first and second pusher assemblies.

3. The collapsible shipping container actuator of claim 1, further comprising a central cross beam at the midpoint of the rigid frame, the central cross beam equipped with downward facing twist-lock assemblies for engaging the upper surface of the collapsible shipping container.

4. The collapsible shipping container actuator of claim 1, wherein the pivoting pusher assemblies rotate through an angle of one hundred eighty degrees.

5. The collapsible shipping container actuator of claim 1, wherein the first and second pivoting pusher assemblies are adapted to engage the end walls of the collapsible container on a bottom edge of the collapsible shipping container.

6. The collapsible shipping container actuator of claim 1, wherein the first and second pivoting pusher assemblies are adapted to operate simultaneously to reduce twisting forces on the container.

7. The collapsible shipping container actuator of claim 1, wherein each pivoting pusher assembly comprises first and second pistons.

\* \* \* \* \*